United States Patent Office 2,982,803
Patented May 2, 1961

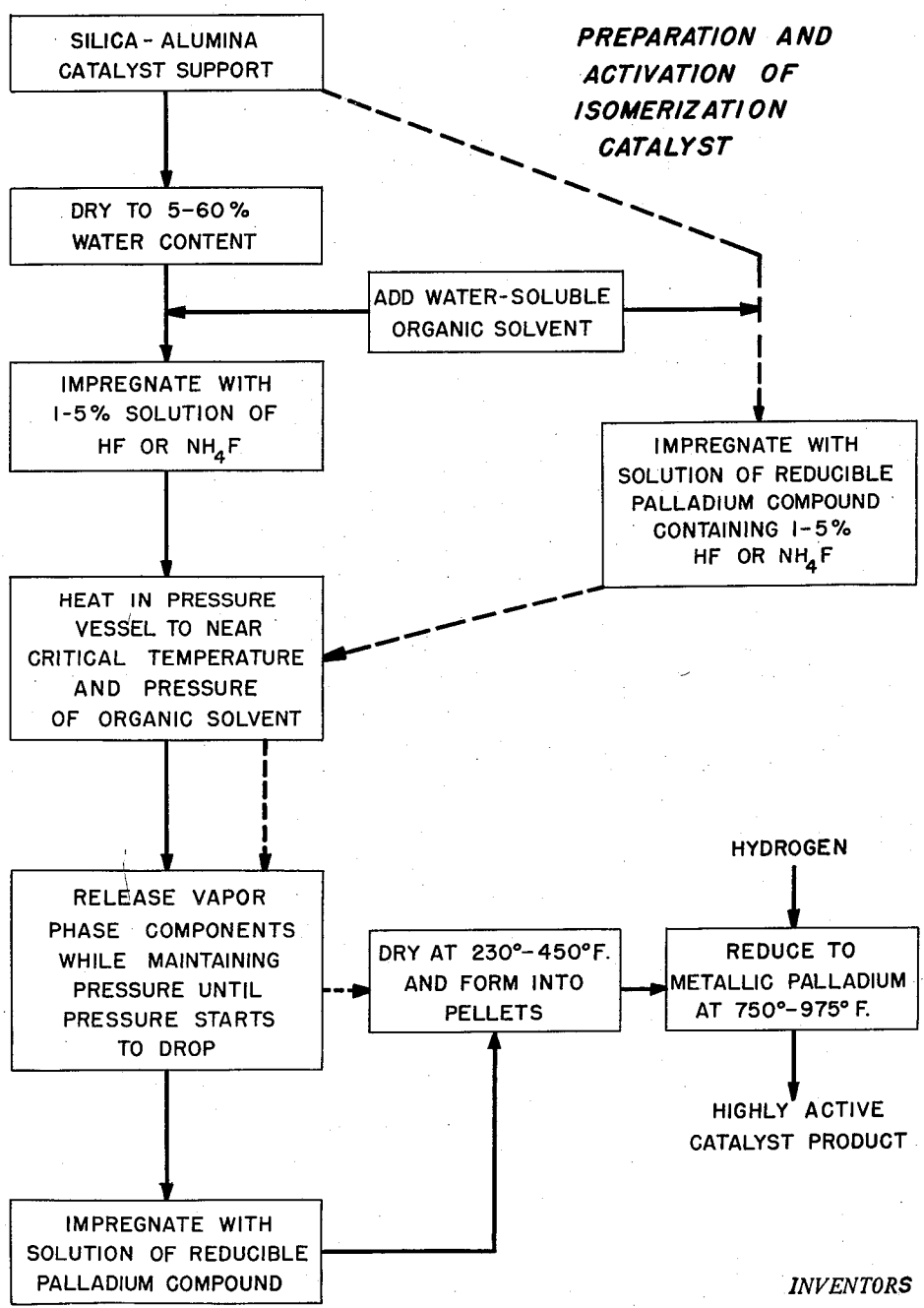

2,982,803

CATALYST AND PROCESS FOR ISOMERIZING NORMAL PARAFFINS

Hillis O. Folkins, Crystal Lake, Ill., Kenneth E. Lucas, West Los Angeles, Calif., and Elmer L. Miller, Cary, Ill., assignors to The Pure Oil Company, Chicago, Ill., a corporation of Ohio Filed Aug. 21, 1959, Ser. No. 835,323

16 Claims. (Cl. 260—683.68)

This invention relates to new and useful improvements in processes for the hydroisomerization of normal paraffin hydrocarbons having 4 to 7 carbon atoms per molecule, and more particularly to an improved isomerization catalyst and method of preparing the same.

It has been found that the hydroisomerization of hydrocarbon feed stocks consisting predominantly of normal paraffin hydrocarbons having 4 to 7 carbon atoms per molecule can be efficiently carried out by passing the feed stocks over a catalyst under moderate temperature isomerization conditions. When paraffin hydrocarbons are isomerized in this manner, a mixture of hydrogen and the hydrocarbon, in a hydrogen/hydrocarbon mol ratio in the range from about 0.5 to 5.0, is passed over a composite catalyst at a pressure within the range from about 100 to 1000 p.s.i.g., and a temperature within the range from about 675° to 775° F. The most effective composite catalyst for the isomerization of normal paraffin hydrocarbons under the conditions just described consists of an acidic silica-alumina support, containing at least 50% wt. silica, and having deposited thereon about 0.01–1.0% wt. of palladium. We have previously found that the treatment of the silica-alumina support with a fluorine-containing compound, such as hydrofluoric acid, ammonium fluoride, fluorocarboxylic acids, fluorinated alcohols, or fluorinated ethers, either prior to or concomitantly with the deposition of palladium on the support, produces an isomerization catalyst having superior isomerization activity. However, we have also found that the treatment of the silica-alumina support with a fluorine-containing compound results in a very substantial reduction in surface area of the catalyst support with the result that the catalyst tends to have a somewhat heterogeneous structure and also tends to decline in activity over extended periods of use.

It is therefore one object of this invention to provide an improved process for the preparation of a highly active isomerization catalyst.

Another object of this invention is to provide a highly active isomerization catalyst capable of effecting the isomerization of low-molecular-weight, normal, paraffin hydrocarbons to isoparaffins in high and sustained yield.

Another object is to provide an improved process for the isomerization of hydrocarbon feed stocks consisting predominantly of low-molecular-weight, normal, paraffin hydrocarbons.

A feature of this invention is the provision of a process for the preparation of a highly active isomerization catalyst in which a silica-alumina support is treated with an aqueous solution of a fluorine-containing compound and a water-soluble, volatile organic compound, the support then being heated to a substantially constant temperature and pressure very slightly below the critical temperature and pressure of the organic liquid. After a short time of treatment (between about 10 minutes and 4 hours) at these conditions, the pressure is released and the gaseous constituents are bled off. The catalyst then is dried at around 230°–450° F. and atmospheric pressure, impregnated with a solution of a reducible palladium compound, and reduced with hydrogen at about 750°–975° F. to produce a highly active catalyst.

Another feature of this invention is the provision of an improved isomerization catalyst consisting of 0.01–1.0% wt. of palladium on silica-alumina, containing 50–95% silica, in which the silica-alumina support has been treated with an aqueous solution of a fluorine-containing compound and a volatile, water-soluble organic liquid either prior to or concomitantly with the impregnation of the support with a palladium compound, followed by heating the catalyst to a temperature and pressure just slightly below the critical temperature and pressure of the organic liquid and slowly bleeding off the gaseous constituents evolved, thereby producing a highly active catalyst having a high, uniform pore volume and high surface area.

A further feature of this invention is the provision of an improved process for the isomerization of normal paraffin hydrocarbons in which said hydrocarbons are passed with hydrogen, at an elevated pressure and a temperature in the range of about 675°–775° F., over a catalyst consisting of 0.01–1.0% wt. palladium on a silica-alumina support, which has been treated with a fluorine-containing compound in the manner above-described.

Other objects and features of this invention will become apparent from time to time throughout the specification and claims as hereinafter related.

In the accompanying drawing, there is shown a flow diagram of our improved method for preparing isomerization catalysts.

According to this invention, it has been found that the effectiveness of a palladium-promoted, silica-alumina, composite isomerization catalyst can be enhanced by treating the silica-alumina support with a fluorine-containing compound (e.g., hydrofluoric acid, ammonium fluoride, fluorocarboxylic acids, fluorinated alcohols, or fluorinated ethers) in aqueous solution either prior to or concomitantly with the deposition of palladium thereon, if certain precautions are taken to prevent undue reduction in the surface area of the support. In the preparation of a catalyst composition in accordance with this invention, the palladium metal is incorporated in the silica-alumina support by impregnation of the support with a solution of a reducible palladium salt, such as the chloride or nitrate, or with a solution of a mixed palladium salt, such as ammonium chloropalladite. The preparation of the catalyst has generally been carried out by impregnating a support with an aqueous solution of palladium chloride, sometimes containing small amounts of an inorganic acid, such as hydrochloric acid. In our process, the catalyst support is dried to a water content in the range from about 5 to 60 wt. percent, and then is wetted with a solution consisting of a 0.1 to 5.0%, based on the weight of the support, of the desired fluorine-containing compound in a mixture of water and a volatile, water-soluble organic liquid, such as methanol, ethanol, isopropanol, tertiary-butanol, methyl ethyl ketone, acetaldehyde, propionaldehyde, sec-butyraldehyde, etc. In defining the term volatile, as used herein, we prefer organic liquids whose boiling points are considerably lower than that of water and whose critical temperatures are in the range of 600° F. or below. By the use of such liquids, the treatment of the catalyst is effected at a temperature below that where tightly bound water is normally driven from the catalyst, and below a temperature at which setting of the catalyst structure occurs. Generally, organic liquids boiling below 100° C. are suitable. The amount of organic liquid used, relative to the amount of water in the resulting mixture of fluorine compound, water, and organic liquid, is not critical, but generally the organic liquid represents around 10–60% of the total volume of the solution, and preferably constitutes 25–60% of the solution.

The concentration used is a controlling factor in the extent of modification effected in the support and is proportional to it. Too high a concentration tends to lower the ultimate density beyond that desired and to decrease the strength of the support or catalyst.

The total amount of organic liquid employed, and hence the amount of treating solution used, should be adjusted so that the organic liquid represents at least 5% of the weight of the catalyst. Treatment, conditions and vessels should be sized so that at least part of the organic liquid is maintained in the liquid or solution phase as the critical or treatment temperatures are approached.

The catalyst support used is silica-alumina, containing 50-95% wt. silica (preferably 75-87% wt.), which has been dried or calcined to a water content in the range of 5-60% wt. and preferably in the range of 15-50% wt. Removal of water below the lower limit specified results in a catalyst of lower activity, and catalyst stability is reduced if an excessive amount of water is present at the time of treatment. The catalyst support which has been wetted with the aqueous solution of the desired fluorine-containing compound and the volatile organic liquid is then placed in a suitable pressure vessel (e.g., an autoclave) and heated to a substantially constant temperature and pressure very slightly less than the critical temperature and pressure of the organic liquid. The gaseous constituents are then bled off from the pressure vessel at said constant pressure until the pressure starts to drop. The pressure is then reduced until atmospheric pressure is attained. The catalyst is then dried at atmospheric pressure at a temperature in the range of about 230°-450° F. If only the support has been treated, a composite catalyst can be prepared by impregnating the support with an aqueous solution of a palladium salt. If the palladium solution has been added simultaneously with the organic liquid and the aqueous solution of the fluorine-containing compound, the catalyst (after drying) is ready for activation by reduction with hydrogen at a temperature of about 750°-975° F. If desired, the catalyst may be formed into suitable catalyst pellets prior to the hydrogen reduction step. If ordinary pelleting be desired, the catalyst is formed into pellets or tablets in a suitable tableting machine after the drying step. If other type of pellets be desired, the catalyst can be extruded while still wet and cut into pellets prior to the drying step.

When hydrogen and $C_4$-$C_7$ n-paraffins in a hydrogen/hydrocarbon mol ratio within the range of about 0.5-5.0 are passed over a catalyst prepared and activated as above described, at a temperature of about 675°-775° F., a pressure of 100-1000 p.s.i.g., and a liquid volume hourly space velocity of 0.5-25.0, a yield of isoparaffins is obtained which is much higher than is obtained at comparable conditions using a catalyst of the same composition which has not had the treatment with a fluorine-containing compound, or the near-critical-temperature evaporation of an organic solvent from the gel. In fact, catalysts which are prepared in accordance with this invention effect higher isoparaffin yields and are less sensitive to aging, i.e., do not decline substantially in activity during extended periods of operation.

The following non-limiting examples illustrate the preparation of palladium-containing isomerization catalysts in accordance with this invention, and in accordance with prior-developed techniques, and also illustrate the relative activities of such catalysts in the hydroisomerization of low-molecular-weight n-paraffin hydrocarbons.

EXAMPLE I

An undried but ion-exchanged silica-alumina hydrogel containing 25% alumina and 75% silica is dried at 230° F. until the water content of the mass is reduced to about 40%. When dried and calcined by conventional methods, this catalyst has a bulk density of 0.61, an average pore diameter of 55 A., and a surface area (after drying) of about 425 m.$^2$/gm. To a 4% solution of HF in water, there is added an equal volume of ethanol. The concentration of HF and the amount of solution are adjusted so that when the mixture is added to the partially dried silica-alumina hydrogel, a thick paste is formed which contains a 2% concentration of HF, based on the water-free silica-alumina. This pasty mass is then heated in an autoclave to 440° F. and maintained at that temperature for 1 hour. The catalyst is dried at this temperature by slowly releasing the vapor phase components to maintain the established pressure until the pressure in the autoclave starts to drop. When the pressure in the autoclave reaches atmospheric pressure, the material is dried at 230° F., after which it is impregnated with 0.5% wt. palladium from a palladium chloride solution. The resulting catalyst is dried and formed into pellets, and then activated by heating at 975° F. in a current of hydrogen for a period of 16 hours to reduce the palladium salt to metallic palladium in a highly active form. After reduction with hydrogen, the catalyst pellets contain 0.5% wt. palladium metal. The catalyst support at this point has a bulk density of 0.55, an average pore diameter of 72 A., and a surface area of 360 m.$^2$/gm. This catalyst is a highly active and renegerable catalyst for the isomerization of n-pentane and does not decline extensively in activity over an extended period of use.

When hydrogen and n-pentane in a 1:1 mol ratio are circulated over the catalyst pellets at a temperature of 700° F., a pressure of 500 p.s.i.g., and a liquid volume hourly space velocity of 3.0 (liquid volume of hydrocarbons fed per hour per unit volume of effective catalyst bed), isopentane is obtained initially in a yield of about 60%. After this catalyst is used for 200 hours in the isomerization of n-pentane, the isopentane yield decreases by only 1%. It is thus seen that the catalyst produced as above-described has a higher initial activity and maintains a sustained activity over an extended period of operation of the process.

When catalysts are prepared following the above-described procedure using different amounts of palladium chloride in the impregnating solution and different catalyst supports, the yields of isopentane obtained in the isomerization of n-pentane vary somewhat in accordance with the catalyst composition. The variations of isopentane yield under the same isomerization conditions described above are tabulated in Table I.

*Table I*

| Catalyst Composition | | Percent Isopentane Yield | | |
|---|---|---|---|---|
| Pd, percent wt. | Ratio (wt.), SiO$_2$/Al$_2$O$_3$ | Initially | After 100 hrs. | After 200 hrs. |
| 0.1 | 75/25 | 58.5 | 57.5 | 57.0 |
| 0.2 | 75/25 | 59.0 | 58.0 | 57.0 |
| 0.3 | 75/25 | 61.0 | 60.0 | 58.8 |
| 0.1 | 87/13 | 59.5 | 59.0 | 58.0 |
| 0.3 | 87/13 | 61.4 | 60.2 | 59.5 |
| 0.5 | 87/13 | 59.0 | 58.0 | 57.5 |

From Example I, it is seen that a catalyst prepared according to the method of this invention has a substantially lower bulk density than conventionally-prepared catalysts, and as might be expected from the action of hydrofluoric acid on silica-alumina supports, the surface area is reduced somewhat and the pore size is increased. Thus, by the process of this invention, it is possible to moderately increase pore size within the range of desired dimensions and at the same time maintain a relatively high surface area. These desired properties are not obtained when the fluoride is added by conventional methods according to the procedure shown below in Example II where drastic reduction in surface area and increase in pore size beyond the desired maximum occurs. The catalyst produced by the process of this invention has a high initial isomerization activity, and declines only slightly in activity over an extended period of use in an isomerization process.

EXAMPLE II

A commercial silica-alumina cracking catalyst, containing 25% alumina and 75% silica is heated to 400° F. to remove readsorbed water, and is dried to a water content of about 4%. This commercial catalyst has a bulk density of 0.61, an average pore diameter of 55 A., and a surface area of 425 m.$^2$/gm. A 250 g. portion of the catalyst is then impregnated at 120° F. with 250 cc. of 2% aqueous hydrofluoric acid, containing sufficient palladium chloride to produce a concentration of 0.5% wt. palladium metal in the catalyst. The amount of solution used is completely absorbed in the pores of the catalyst support and converts the same to a wet powdered or granular mass. The impregnated catalyst mass is then extruded through a die and cut into pellets ⅛" in diameter. The catalyst pellets are dried at 230° F. for 16 hours, and activated by heating at 975° F. in a current of hydrogen for a period of 16 hours to reduce the palladium salt to metallic palladium in a highly active form. After reduction with hydrogen, the catalyst pellets contain 0.5% wt. palladium metal. At this point, the average pore diameter in the catalyst is increased to 145 A. and the catalyst surface area is only 150 m.$^2$/gm. It is thus seen that the treatment of the catalyst with hydrofluoric acid results in a drastic reduction in surface area with an accompanying large increase in pore diameter in the support. Nevertheless, a highly active catalyst is obtained.

When hydrogen and n-pentane in a 1:1 mol ratio are circulated over the catalyst pellets at a temperature of 700° F., a pressure of 500 p.s.i.g., and a liquid volume hourly space velocity of 3.0, isopentane is obtained in a yield of approximately 55%, initially. After 100 hours of isomerization using this catalyst, the isopentane yield drops to about 52%, and after 200 hours of operation decreases to about 49%.

The following examples show the preparation of catalysts using the procedure of Example II, except that the amount of palladium chloride in the impregnating solution is varied to produce catalysts having different concentrations of palladium metal, and different silica-alumina support compositions are employed. Following this procedure, catalysts prepared using solutions of palladium chloride in aqueous hydrofluoric acid, and containing concentrations of palladium salt which produce the indicated concentrations of palladium on the catalyst support, are listed in Table II. When these catalysts are pelleted, dried, and activated by reduction with hydrogen, and evaluated for activity in the isomerization of n-pentane under the above-described isomerization operating conditions, the yields of isopentane, both initially and after 100 and 200 hours, respectively, are as indicated in Table II.

*Table II*

| Catalyst Composition | | Percent Isopentane Yield | | |
|---|---|---|---|---|
| Pd, percent wt. | Ratio (wt.), SiO$_2$/Al$_2$O$_3$ | Initially | After 100 hrs. | After 200 hrs. |
| 0.1 | 75/25 | 55.3 | 52.1 | 49.5 |
| 0.2 | 75/25 | 57.0 | 54.0 | 51.0 |
| 0.3 | 75/25 | 56.3 | 53.5 | 50.8 |
| 0.1 | 87/13 | 59.3 | 56.5 | 53.0 |
| 0.2 | 87/13 | 60.4 | 57.2 | 54.0 |
| 0.5 | 87/13 | 56.0 | 53.8 | 51.2 |

From this table, it is seen that while the impregnation of catalyst supports with aqueous hydrofluoric acid results in a catalyst having a high initial activity for the isomerization of n-pentane, the catalyst activity declines substantially over an extended period of operating time under isomerization conditions. The catalysts which are produced in this manner are more dense, have larger pore diameters, and substantially lower surface areas than catalysts produced in accordance with this invention, as described in Example I.

EXAMPLE III

A number of catalysts prepared to have compositions similar to those described in Example I, but without the hydrofluoric acid treatment, are listed in Table III. In making these catalysts, silica-alumina hydrogels, containing 87% silica and 13% alumina, or 75% silica and 25% alumina, on a dry basis, are impregnated with hydrochloric acid solutions containing palladium chloride in amounts sufficient to produce the desired palladium concentrations in the finished catalysts, said solutions being mixed with a substantially equal volume of ethanol. The catalysts are heated in an autoclave to 440° F., and are maintained at that temperature for 1 hour. The catalysts then are dried at this temperature by slowly releasing the vapor phase components to maintain the established pressure until the pressure in the autoclave starts to drop. After the pressure has been reduced to atmospheric pressure, the catalysts are dried at 230° F. and atmospheric pressure, and then formed into catalyst pellets. The catalyst pellets are reduced with hydrogen at 975° F., as in the other examples. When these catalysts are evaluated for activity in the isomerization of n-pentane using the same conditions of temperature, pressure, hydrocarbon/hydrogen mol ratio, and space velocity as in the previous examples, results are obtained as indicated in Table III.

*Table III*

| Catalyst Composition | | Percent Isopentane Yield | | |
|---|---|---|---|---|
| Pd, percent wt. | Ratio (wt.), SiO$_2$/Al$_2$O$_3$ | Initially | After 100 hrs. | After 200 hrs. |
| 0.1 | 75/25 | 22.0 | 21.0 | 21.0 |
| 0.2 | 75/25 | 32.0 | 31.0 | 30.5 |
| 0.3 | 75/25 | 34.5 | 33.5 | 33.0 |
| 0.5 | 75/25 | 41.2 | 40.2 | 39.7 |
| 0.1 | 87/13 | 38.0 | 37.0 | 36.5 |
| 0.2 | 87/13 | 46.1 | 45.1 | 44.5 |
| 0.5 | 87/13 | 46.5 | 45.5 | 44.9 |

These catalysts have a bulk density of about 0.55, a pore size of 60–65 A. and surface areas of about 400–450 m.$^2$/gm. The catalysts which are obtained are slightly improved over catalysts produced by conventional techniques but do not compare at all favorably in activity with the catalysts which have been treated with a fluorine-containing compound such as hydrofluoric acid.

EXAMPLE IV

A silica-alumina hydrogel containing 75% silica and 25% alumina, on a dry basis, is dried to a water content of about 40%. A 4% aqueous solution of ammonium fluoride is mixed with approximately an equal volume of methanol and the catalyst is impregnated therewith to a fluorine-content of 2%, based on the dry silica-alumina. The mass is heated in an autoclave to 430° F. and is maintained at that temperature for 1 hour. The catalyst is dried at this temperature by slowly releasing the vapor phase components to maintain the established pressure, until the pressure in the autoclave starts to drop. After reaching atmospheric pressure, the material is dried at 230° F., after which it is impregnated with 0.5% palladium from a palladium chloride solution. The catalyst thus prepared has a much higher surface area, more uniformly controlled pore dimensions than a similar catalyst prepared by merely impregnating the catalyst support with aqueous ammonium fluoride, a lower bulk density, is more active in n-pentane isomerization, and does not decline substantially in activity over an extended period of use. As in the other examples, the palladium may be added to the catalyst support along with the ammonium fluoride solution. With such a procedure, the catalyst is reduced with hydrogen at about 750°–975° F. immediately after drying.

EXAMPLE V

In other embodiments of this invention, different portions of a silica-alumina hydrogel, containing 25% alumina and 75% silica, on a dry basis, are dried at 230° F. to a water content of about 40%, and separate portions of this silica-alumina are treated with aqueous solutions of fluorine-containing compounds in admixture with an equal volume of a volatile, water-soluble organic compound, as indicated in Table IV. Table IV shows the type of fluorine compounds used, together with their concentrations in the mixtures of water and organic compounds, the volatile organic compound used, and the near-critical temperatures at which the organic solvent is distilled off. In these experiments, the procedure followed is the same as in Example I, except for the substitution of the specific compounds indicated in Table IV.

*Table IV*

| 75/25 silica-alumina | | Initial pore diameter 55 A., surface area 425 m.²/gm. | |
| --- | --- | --- | --- |
| F compound and concentration | Organic liquid | Processing temp., °F. | Final pore diameter, A. | Final surface area, m.²/gm. |
| 2% HF | $CH_3OH$ | 440 | 72 | 360 |
| 2% $NH_4F$ | $CH_3COCH_3$ | 430 | 60 | 400 |
| 2% $CF_3COOH$ | $i$-$C_3H_7OH$ | 440 | 85 | 320 |
| 2% $CF_3CH_2OH$ | $t$-$C_4H_9OH$ | 420 | 58 | 375 |
| 2% $CF_3OCF_3$ | $CH_3COC_2H_5$ | 410 | 95 | 300 |
| 2% $CF_3OH$ | $CH_3CHO$ | 350 | 70 | 360 |
| 2% HF | $C_2H_5CHO$ | 360 | 85 | 300 |
| 2% $NH_4F$ | $i$-$C_3H_7CHO$ | 370 | 65 | 380 |

From these examples, it is seen that a variety of fluorine-containing compounds are operative in this process, as well as a variety of organic liquids which may be used in conjunction therewith to produce a catalyst support having a large pore diameter and a high surface area. In each case, the catalyst produced upon impregnation with an aqueous solution of a palladium compound, followed by reduction with hydrogen at a temperature in the range from 750° to 975° F., is highly active for the isomerization of n-paraffin hydrocarbons, particularly n-pentane and n-hexane.

The catalysts which are produced in accordance with this invention, each and all, have a large pore size and high surface area as well as a low bulk density. These catalysts, when impregnated with 0.01–1.0% wt. palladium, preferably 0.1–0.6% wt., and reduced with hydrogen at about 975° F., are superior isomerization catalysts with very high initial activities, and they do not decline substantially in activity with extended use as do other fluorided isomerization catalysts. These catalysts are operative to produce high isomerization yields at temperatures considerably below those employed with conventional isomerization catalysts. Thus, the isomerization process can be carried out at conditions where more favorable thermodynamic equilibria for the formation of branched-chain paraffins exist. This permits higher conversions, per pass, to the desired isomers. Alternatively, under given operating conditions much higher space velocities (of the order of 3 or 4 times as great) can be employed, at the conversion level, than is possible with catalysts wherein the support has not been subjected to treatment with the fluorine-containing compound together with a volatile, water-soluble organic liquid which is subsequently distilled out at a temperature and pressure close to the critical temperature and pressure of the organic liquid. These catalysts will effect considerable savings in the amount of catalyst required and in the size of reactor required for an isomerization plant of given design capacity.

The operating conditions for isomerization of n-paraffins using the highly active catalysts of this invention are normally selected so that degeneration or fouling of the catalyst is minimized. These catalysts are less sensitive to operating temperature changes than are catalysts which have been treated with a fluorine-containing compound in the absence of the prescribed treatment with a volatile, water-soluble organic liquid. Nevertheless, it is desirable to maintain the isomerization reaction temperature within a relatively narrow range. The optimum reaction temperature range is about 700°–740° F., although the range from 675°–775° F. is operative. The catalyst may become fouled after long process periods or as a result of unusual variations in temperatures or hydrocarbon/hydrogen ratio, and thus may require reactivation or regeneration at intervals of once or twice a year. The regeneration process is one in which the catalyst is oxidized to eliminate carbonaceous deposits and then reduced with hydrogen. The oxidation and reduction temperatures used are such that the catalyst is not subjected to sintering and the activity of the catalyst thus remains high. The catalyst is oxidized using air or oxygen at a temperature in the range from about 700°–950° F. The catalyst is most effectively regenerated if it is subjected to air at a pressure of one atmosphere, for a period of 2 to 8 hours, at a temperature of 800°–875° F. The oxidized catalyst is then reduced and reactivated by treatment and the partial pressure of air or oxygen is controlled to prevent temperature rise if much carbon has been deposited. The catalyst is then reduced at a temperature in the range from about 750°–950° F. If the optimum conditions of oxidation and reduction of the catalyst are used, the catalyst is regenerated and reactivated to substantially virgin activity.

In isomerizing n-paraffins containing 4 to 7 carbon atoms per molecule, in accordance with this invention, the catalyst used is one of the composition described above, and prepared using the procedure described as defining this invention. The catalyst support is a silica-alumina hydrocarbon cracking catalyst which contains 50–95% silica, preferably 75–87% silica. The catalyst support is treated with a mixture of an aqueous solution of a fluorine-containing compound and a water-soluble, volatile organic compound. The catalyst is treated further by being subjected to evaporation of the organic liquid in a pressure vessel at a temperature and pressure close to the critical temperature and pressure of the organic liquid. This procedure results in the production of a fluorided catalyst having a large pore diameter, high surface area, and low bulk density. The catalyst is impregnated with a palladium compound in aqueous solution, dried, and activated by reduction with hydrogen at 750°–975° F. Under the conditions of isomerization used in this process, catalysts supported on pure silica or pure alumina are substantially inoperative. Thus, a catalyst consisting of 0.6% wt. platinum on alumina produces only a negligible yield of isopentane under the operating conditions used in this isomerization process. Platinum on silica is equally ineffective.

In the isomerization of different $C_4$–$C_7$ n-paraffins, the optimum isomerization conditions are different for different hydrocarbons, as shown in Table V.

*Table V*

[Optimum Conditions for Isomerization of $C_4$–$C_7$ Normal Paraffin Hydrocarbons]

| Temp. °F. | Range | Preferred Range |
| --- | --- | --- |
| n-$C_4$ | 700–800 | 725–800 |
| n-$C_5$ | 675–775 | 700–740 |
| n-$C_6$ | 650–740 | 675–725 |
| n-$C_7$ | 600–725 | 625–700 |
| Pressure, p.s.i.g. | 100–1,000 | 350–750 |
| Liquid volume hourly space velocity | 0.5–25.0 | 2–10 |
| $H_2$/hydrocarbon mol ratio | 0.5–5.0 | 1.5–4.5 |

It is apparent that when mixed feed stocks are employed, a compromise must be effected in selecting the temperature which is to be used in order to produce optimum activity and selectivity for the desired isoparaffins without producing substantial amounts of hydrocracking as a concomitant, undesirable side reaction. The optimum temperature is one which in most cases must be determined experimentally in accordance with the relative proportions of isomerization of the various $C_4$–$C_7$ hydrocarbons. Optimum operation can also be obtained by passing the hydrocarbon feed through a suitable fractionating system to separate the individual hydrocarbons for isomerization under optimum conditions for each hydrocarbon. The products of each isomerization may then be combined into a single product.

While we have described our invention fully and completely as required by the patent statutes, with special emphasis upon one or more preferred embodiments, we wish it understood that within the scope of the appended claims this invention may be practiced otherwise than as specifically described.

What is claimed is:

1. The method of preparing a hydrocarbon isomerization catalyst in a highly active, regenerable form which comprises impregnating a silica-alumina support containing at least 50% wt. silica and 5–60% wt. water with an aqueous solution of a compound selected from the group consisting of hydrofluoric acid, ammonium fluoride, fluorocarboxylic acids, fluorinated alcohols, and fluorinated ethers, and 10 to 60% by volume of said solution of a volatile, water-soluble organic liquid in total amount sufficient to maintain a liquid phase as the critical temperature of the organic liquid is approached, heating the impregnated catalyst support in a pressure vessel to a substantially constant temperature and pressure slightly less than the critical temperature and pressure of the organic liquid, releasing the gaseous constituents from said pressure vessel at said constant pressure until the pressure starts to drop, then reducing the pressure until atmospheric pressure is reached, drying the catalyst support at 230°–450° F., impregnating the dried support with a solution of a reducible palladium compound, and reducing the impregnated catalyst with hydrogen at a temperature of about 750°–975° F.

2. A method in accordance with claim 1 in which the organic liquid is selected from the group consisting of methanol, ethanol, isopropanol, tertiary-butanol, acetone, methyl ethyl ketone, acetaldehyde, propionaldehyde, and isobutyraldehyde.

3. A method in accordance with claim 2 in which the palladium compound solution is of a concentration sufficient to produce a palladium concentration of 0.01–1.0% wt. on the catalyst.

4. A method in accordance with claim 2 in which the catalyst is formed into small pellets prior to reduction with hydrogen.

5. A method in accordance with claim 1 in which the fluorine-containing compound is hydrofluoric acid, the organic liquid is methanol, and the catalyst while in the pressure vessel is heated to 400° F. for at least 1 hour.

6. A method in accordance with claim 1 in which the fluorine-containing compound is ammonium fluoride, the organic liquid is methanol, and the catalyst while in the pressure vessel is heated to 400° F. for at least 1 hour.

7. A method in accordance with claim 1 in which the fluorine-containing compound is trifluoroacetic acid, the organic liquid is methanol, and the catalyst while in the pressure vessel is heated to 400° F. for at least 1 hour.

8. The method of preparing a hydrocarbon isomerization catalyst in a highly active, regenerable form which comprises impregnating a silica-alumina support containing at least 50% wt. silica and 5–60% wt. water with an aqueous solution containing a compound selected from the group consisting of hydrofluoric acid, ammonium fluoride, fluorocarboxylic acids, fluorinated alcohols, and fluorinated ethers, and a reducible palladium compound, and 10 to 60% by volume of said solution of a volatile water-soluble organic liquid in total amount sufficient to maintain a liquid phase as the critical temperature of the organic liquid is approached, heating the impregnated catalyst support in a pressure vessel to a substantially constant temperature and pressure slightly less than the critical temperature and pressure of the organic liquid, releasing the gaseous constituents from said pressure vessel at said constant pressure until the pressure starts to drop, then reducing the pressure until atmospheric pressure is reached, drying the catalyst support at 230°–450° F., and reducing the catalyst with hydrogen at a temperature in the range from about 750°–975° F.

9. A method in accordance with claim 8 in which the organic liquid is selected from the group consisting of methanol, ethanol, isopropanol, tertiary-butanol, acetone, methyl ethyl ketone, acetaldehyde, propionaldehyde, and isobutyraldehyde.

10. A method in accordance with claim 8 in which the palladium compound solution is of a concentration sufficient to produce a palladium concentration of 0.01–1.0% wt. on the catalyst.

11. A hydroisomerization catalyst produced and activated in accordance with claim 1.

12. A hydroisomerization catalyst produced and activated in accordance with claim 3.

13. A hydroisomerization catalyst produced and activated in accordance with claim 8.

14. The method of isomerizing $C_4$–$C_7$ n-paraffin hydrocarbons which comprises passing hydrogen and a n-paraffin hydrocarbon at a temperature in the range from about 675°–775° F., sufficient to effect isomerization, a pressure of about 100–1000 p.s.i.g., a liquid volume hourly space velocity in the range from about 0.5 to 25.0, and a hydrogen/hydrocarbon mol ratio within the range from about 0.5 to 5.0, over a catalyst prepared and activated in accordance with claim 1.

15. The method of isomerizing $C_4$–$C_7$ n-paraffin hydrocarbons which comprises passing hydrogen and a n-paraffin hydrocarbon at a temperature in the range from about 675°–775° F. sufficient to effect isomerization, a pressure of about 100–1000 p.s.i.g., a liquid volume hourly space velocity in the range from about 0.5 to 25.0, and a hydrogen/hydrocarbon mol ratio within the range from about 0.5 to 5.0, over a catalyst prepared and activated in accordance with claim 3.

16. The method of isomerizing $C_4$–$C_7$ n-paraffin hydrocarbons which comprises passing hydrogen and a n-paraffin hydrocarbon at a temperature in the range from about 675°–775° F., sufficient to effect isomerization, a pressure of about 100–1000 p.s.i.g., a liquid volume hourly space velocity in the range from about 0.5 to 25.0, and a hydrogen/hydrocarbon mol ratio within the range from about 0.5 to 5.0, over a catalyst prepared and activated in accordance with claim 8.

References Cited in the file of this patent

UNITED STATES PATENTS

| | | |
|---|---|---|
| 2,611,749 | Haensel | Sept. 23, 1952 |
| 2,623,861 | Haensel | Dec. 30, 1952 |
| 2,834,823 | Patton et al. | May 13, 1958 |
| 2,840,527 | Brennan et al. | June 24, 1958 |